(No Model.)
E. L. D. HOYLE.
CAKE BEATER AND BATTER DROPPER.
No. 547,263. Patented Oct. 1, 1895.
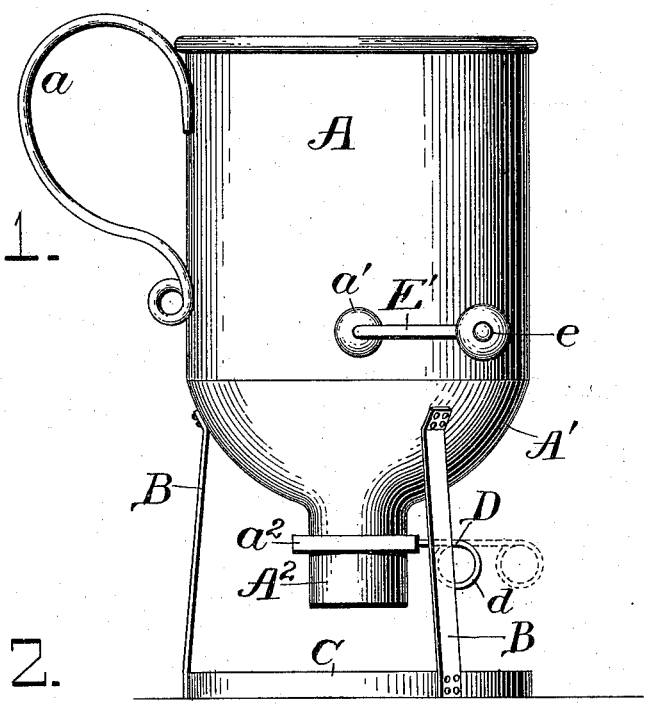
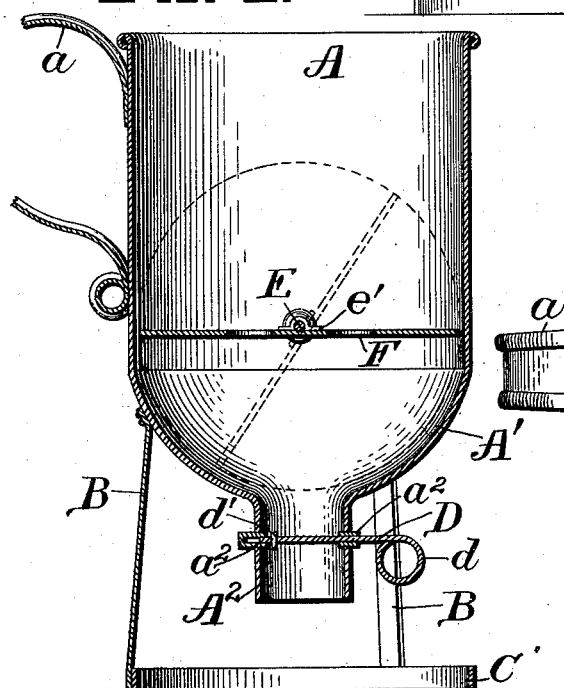
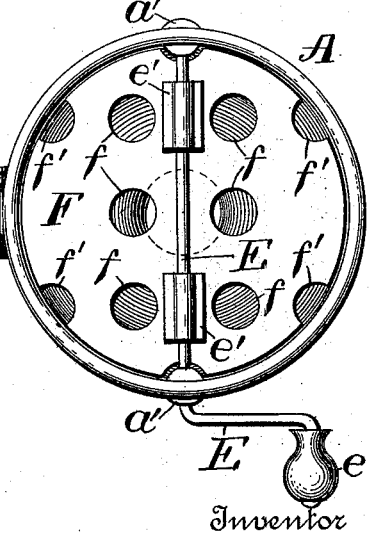
Witnesses
Percy C. Bowen
J. C. Wilson
Inventor
E. L. D. Hoyle,
by Whitman & Wilkinson
Attorneys.

UNITED STATES PATENT OFFICE.

ELLA L. D. HOYLE, OF NEW ORLEANS, LOUISIANA.

CAKE-BEATER AND BATTER-DROPPER.

SPECIFICATION forming part of Letters Patent No. 547,263, dated October 1, 1895.

Application filed November 30, 1894. Serial No. 530,445. (No model.)

*To all whom it may concern:*

Be it known that I, ELLA L. D. HOYLE, a citizen of the United States, residing at New Orleans, in the parish of Orleans and State of Louisiana, have invented certain new and useful Improvements in Cake-Beaters and Batter-Droppers; and I do hereby declare the following to be a full, clear, and exact description of the invention, such as will enable others skilled in the art to which it appertains to make and use the same.

My invention relates to improvements in cake-beaters and batter-droppers; and it consists in certain novel features hereinafter described and claimed.

Reference is had to the accompanying drawings, in which the same parts are indicated by the same letters throughout the several views.

Figure 1 represents a side elevation of an improved cake-beater and batter-dropper. Fig. 2 represents a central vertical section through the same, and Fig. 3 represents a plan view of the same.

A represents the vessel intended to contain the mixture to be beaten, and it is preferably provided with a base A' in the form of a zone of a sphere, and a cylindrical spout A², through which the fluid is discharged. The vessel is preferably provided with a handle $a$ of the ordinary construction. The said vessel rests upon three or more legs B, which are attached to the ring C, which is concentric with the spout A². The said ring is open top and bottom and is preferably about the diameter and depth of an ordinary batter-cake. The spout A² is provided with a slotted frame $a^2$, in which the slide D enters, which slide is provided with a handle $d$ for operating the same, and a stop $d'$ for limiting the outward and inward travel of the said slide, and hence preventing the withdrawal of the slide and also indicating when the said slide is in the closed position.

The vessel A is provided with circular bearing $a'$, through which passes the spindle E, which is bent outward to form a hand-crank E', which is provided with a handle $e$. The disk F is attached rigidly to the spindle E by means of the bent plates $e'$, soldered or otherwise fastened both to the said spindle and to the said disk. This disk F is provided with a plurality of perforations $f$ in the body thereof, and also with perforations $f'$ projecting inwardly into the periphery. The said disk fits snugly into the cylindrical vessel A, and when revolved its periphery comes close to the interior of the spherical bottom A', as shown in dotted lines in Fig. 2.

The operation of the device is as follows: For making ordinary griddle-cakes the ingredients are put into the top of the vessel A and are thoroughly mixed by rapidly turning the hand-crank E'. The disk F, revolving close against the interior of the spherical bottom A', keeps the unmixed particles from adhering to this bottom, while the holes in the said disk enable the mixture to pass in and out freely and insure the rapid mixing of the ingredients and at the same time the injection of the necessary amount of air to make the cakes light. When the batter has been properly mixed, the slide D is withdrawn until the batter about fills the ring C, when the slide should be closed. At this time the utensil is supposed to be placed on the griddle, and the ring will not only enable the cook to regulate the supply of batter dropped from the utensil, but will also enable the said cook to make a perfectly round cake and at the same time to prevent the batter from one cake joining with the batter from the next cake and rendering it necessary to cut the two apart, as ordinarily happens in the usual practice of cooking.

It will be obvious that the utensil may also be used for beating up cake, salid-dressing, or for other like purposes.

It will be seen that the ring C not only forms a mold for griddle-cakes, but it also forms a platform or support for the utensil and enables the said utensil to be conveniently used on a table or shelf.

By the herein described construction the necessity for stirring up with a spoon is entirely obviated and the ingredients to be cooked are very much more thoroughly mixed up than by the ordinary hand process now most commonly employed. These and the various other advantages of the herein-described construction will readily suggest themselves to any practical housekeeper or cook.

It will be obvious that various modifications of the herein-described apparatus might be made which could be used without departing from the spirit of my invention.

Having thus described my invention, what I claim, and desire to secure by Letters Patent of the United States, is—

1. In a utensil of the character described, the combination with a cylindrical vessel provided with a spherical base, and a spout beneath said base with a valve for controlling the same, of a spindle set transverse to said base, and a perforated disk fast to said spindle and rotating therewith, the said disk moving in juxtaposition to said spherical base, substantially as and for the purposes described.

2. In a utensil of the character described, the combination with a cylindrical vessel provided with a spherical base and a spout beneath said base set transverse to said base, and a perforated disk fast to said spindle, and rotating therewith, the said disk moving in juxtaposition to said spherical base, a ring and legs permanently connecting said ring with said vessel, the said ring forming both a cake mold and a support for said vessel.

In testimony whereof I affix my signature in presence of two witnesses.

ELLA L. D. HOYLE.

Witnesses:
JNO. J. WARD,
WM. D. HOYLE.